United States Patent

Lesher

[15] 3,641,539

[45] Feb. 8, 1972

[54] REMOTE MONITORING AND CONTROL SYSTEM

[72] Inventor: John C. Lesher, Erie, Pa.

[73] Assignee: James Barber, Erie, Pa. a part interest

[22] Filed: Dec. 23, 1968

[21] Appl. No.: 786,316

[52] U.S. Cl. 340/123.1, 340/409, 340/412, 340/227, 340/261

[51] Int. Cl. G08b 29/00, G08b 19/00

[58] Field of Search 340/213.1, 412, 181, 409, 213.2

[56] References Cited

UNITED STATES PATENTS

| | | | |
|---|---|---|---|
| 2,664,556 | 12/1953 | Sontheimer | 340/181 |
| 2,987,712 | 6/1961 | Polyzou | 340/412 |
| 3,070,672 | 12/1962 | Haas | 340/412 |
| 3,492,426 | 1/1970 | Foreman | 340/412 |

*Primary Examiner*—Thomas B. Habecker
*Attorney*—Jones & Lockwood

[57] ABSTRACT

A system is disclosed which is capable of monitoring the condition of an apparatus, generating signals indicative of that condition, and, at a remote location, providing signals indicative of the detected status. The remote unit comprises a controllable oscillator which produces a signal which may be pulsed, or modulated, to represent data to be sent to the base station. The base unit includes three monitoring circuits responsive to the pulse rate of the data signals to provide positive readings of the status of the device being monitored. The first monitoring circuit represents a rest condition at the remote station when in a first state of energization, and indicates an alarm, or fault, condition when in a second state of energization, for example. In this second state, the second monitoring network is also energized to provide a positive indication of the alarm. The third monitoring circuit is a self-surveillance circuit which becomes energized when the telemetering network malfunctions. By energizing the monitoring networks in various combinations, additional information concerning the remote station can be derived. Audible alarm means are provided in conjunction with the monitoring networks to indicate a fault condition at the remote unit. Switching means are provided to turn the audible alarm off during the time that the fault condition is being corrected, the alarm again sounding when corrections have been made and the system is ready to be returned to its monitoring condition.

24 Claims, 9 Drawing Figures

INVENTOR
JOHN C. LESHER
BY Beale and Jones
ATTORNEYS

INVENTOR
JOHN C. LESHER
BY Beale and Jones
ATTORNEYS

INVENTOR
JOHN C. LESHER
BY Beale and Jones
ATTORNEYS

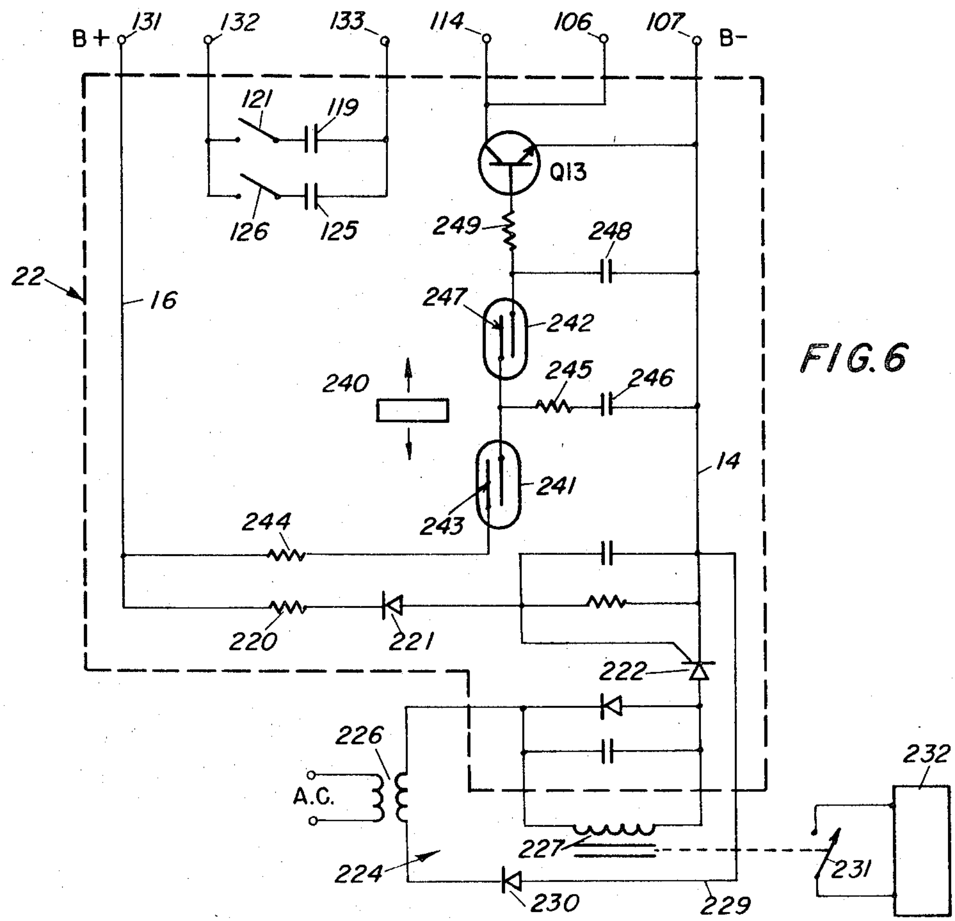
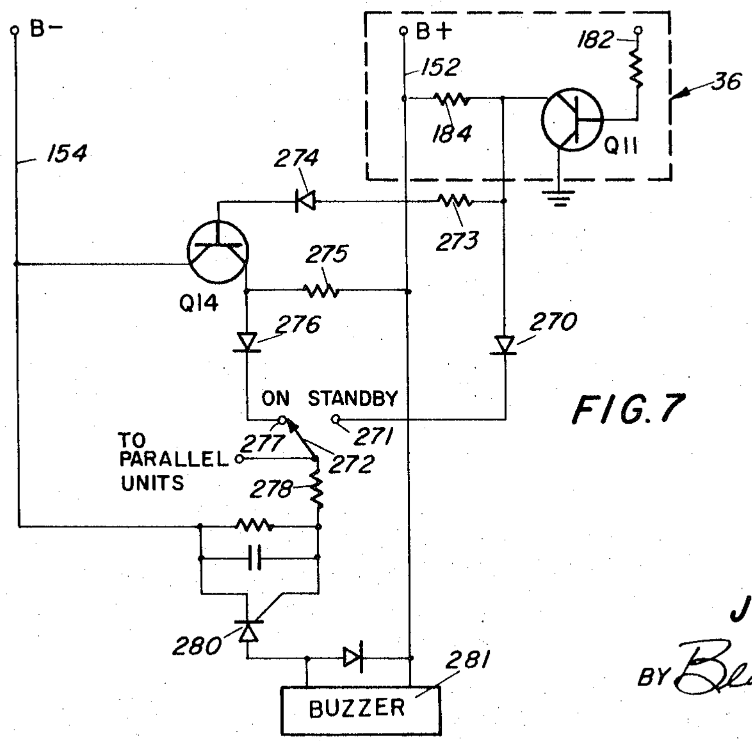
INVENTOR
JOHN C. LESHER
BY Beale and Jones
ATTORNEYS

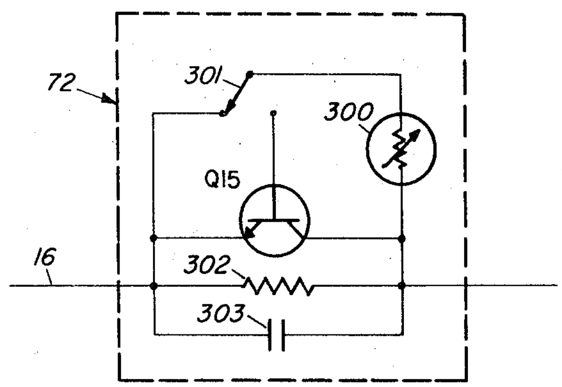
F/G.8
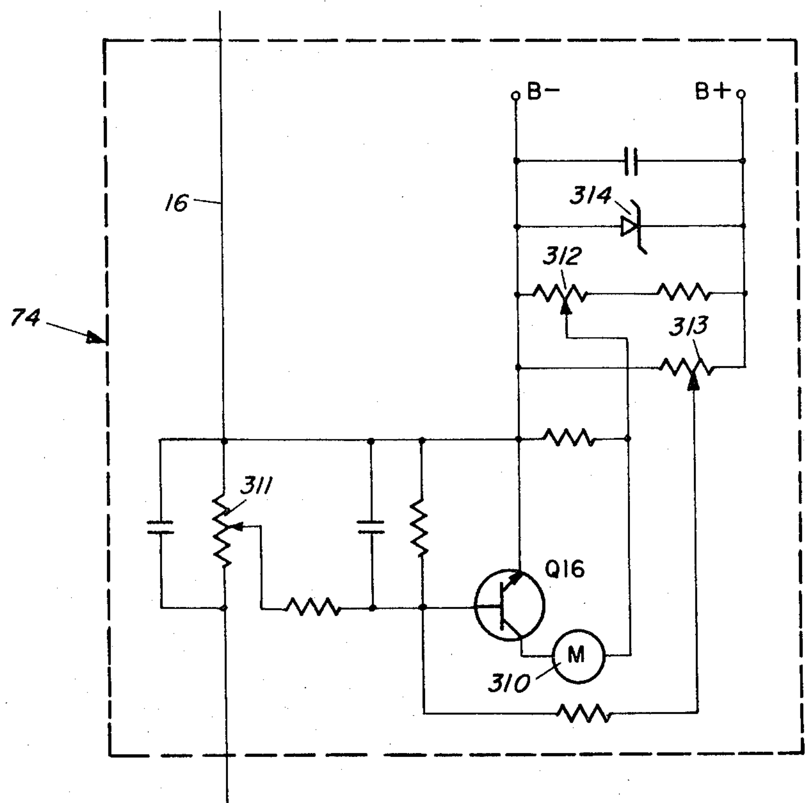
F/G.9
INVENTOR
JOHN C. LESHER
BY Beale and Jones
ATTORNEYS

REMOTE MONITORING AND CONTROL SYSTEM

BACKGROUND OF THE INVENTION

The present invention relates, in general, to systems for monitoring, controlling or communicating with remotely located circuits or mechanical devices; more particularly, the invention relates to a system for detecting the status of a burglar alarm, fire alarm, or the like, and for monitoring the operation of mechanical devices such as machine tools, electric motors, pumps, or the like, and providing at a base station positive indication of the circuits and status so monitored.

Systems for carrying to a base location signals indicative of the state or status of remote equipment are, of course, well known, and over the years large numbers of complex systems have been devised for providing accurate and reliable indications of remote conditions. The prior art has become extremely adept at transmitting such information, but in virtually every system thus far devised, a major problem has been the detection of false signals due to malfunctions in the system. These malfunctions can occur in the remote unit, in the monitoring networks of the base unit or in the connections between these units. Where such a malfunction occurs, it is possible that an alarm or other fault condition can occur unnoticed with resultant damage to the equipment being monitored, and corresponding serious economic loss is possible.

A further difficulty observed in many prior systems is the requirement for a power supply at the remote location. Where the remote unit is to be located at a relatively inaccessible spot, this requirement often presents an insurmountable problem. Further, where the remote location is in an environment where power supplies can present a hazard, as for example, in a coal mine where a small spark might cause a dust explosion, such prior systems cannot be used.

Finally, such systems are often designed for specific uses and applications, and thus are not suitable for general purpose applications. On the other hand, where some flexibility is built into prior systems, their design becomes complex and economic factors prevent their use, for it is undesirable to use a highly sophisticated system in an application which can be handled by a very simple system, even though the complex arrangement might be capable of providing the required function.

SUMMARY OF THE INVENTION

It is an object of the present invention to overcome the disadvantages of prior art systems by providing a simplified electronic system which is constructed in a modular form to provide great flexibility in function and use.

It is a further object of the present invention to provide a modular system which produces positive indications of system status and which is self-surveying to prevent errors due to system malfunction.

Another object of the present invention is to provide a modular system which is capable of reliably monitoring equipment and apparatus located remotely from a base station and where the remote portion of the unit does not require a power supply.

Briefly, the invention comprises a base unit and a remote unit interconnected by means of suitable cables or wires which serve to carry operational power from the base unit to the remote station and which carry pulses representative of the status of the device being monitored from the remote station to the base station. In addition to its monitoring functions, the system is also capable of providing control signals to the remote unit for the purpose of effecting control operations at the remote station. The system may be used, for example, to respond to remotely located burglar alarms, fire alarms and related equipment, to operate and to sense the functioning of remotely located machines such as presses, ventilating systems such as may be used in coal mines, gate or yard controls such as may be used in lumber supply yards, to monitor and control offshore drilling equipment, oil or gas fuel pumps and equipment, and to provide remote indications of machine tool operations and similar systems which require surveillance and/or control functions.

The remote portion of the system includes an oscillator and means for controllably pulsing, or modulating, the oscillator output in response to sensed conditions. The unit's modular construction permits its use with a great variety of sensor devices without requiring changes in the oscillator or controller modules. The remote unit is connected to the base station by way of two lines which serve to carry power from the base station to the remote unit and, in addition, transmit the oscillator output to the base unit.

The base station consists of three basic indicator modules which serve to monitor the condition being sensed at the remote station and to provide indications of the sensed condition. Each module carries an indicator lamp for visual monitoring, with an alarm module being available to provide audible signaling. The first module may be provided with a green indicator lamp which will respond to the "normal," or "ready," output of the remote oscillator to provide a blinking signal. This pulsing green light indicates a clear supervised circuit from the base station to the remote station and indicates to the system operator that the connecting wires and components are working properly. This is the first mode of operation for the present system.

The second mode of operation of the system results from a change in the output from the remote oscillator. This change produces a steady glow from the indicator lamp of the first monitor section and a resultant steady glow from the second indicator module which may, for example, carry a red indicator lamp. This condition may be indicative of machine operation, where mechanical motion of some type is to be detected, may represent a burglar or fire alarm, or may represent some other function, depending on the use to which the system is being put. This mode may be termed an "active" condition of the system.

The third mode of operation occurs in response to a malfunction within the system. A malfunction such as a broken or shorted connecting wire or a defective component at the base or remote stations will result in energization of the third monitoring section. An amber lamp, for example, may be used to provide a visual indication of the malfunction.

The fourth mode of operation available in the system provides an alternate blinking of the green and amber lamps and is indicative of a unique output from the oscillator which may result from a specified machine operation, may indicate the activation of a specific circuit such as a burglar alarm, or may be a manually initiated signal to permit communication between the remote and base stations. This mode may be termed a "warning" condition.

The final mode which will be described provides a sequential blinking of all three indicator module lamps to provide a positive indication of a specified condition at the remote station. Again, this may be responsive to a manually actuated signal, or one produced by a predetermined condition. For convenience, this may be referred to as a "signaling" condition. In general, the remote unit may be said to exhibit two conditions: a "ready" condition, and a fault condition, the former occurring when the remote unit is operating properly, and the latter when the remote oscillator is operating at a frequency other than its normal rate. Thus, one of the primary features of the invention lies in its flexibility, which permits indication of a great variety of remote conditions accurately and reliably, with positive and easily identified output signals assuring quick response to a fault condition.

The system preferably is completely solid state, with each module being complete in itself. Except for the various switches, the modules are encapsulated in a suitable epoxy compound to withstand fungus, moisture and chemical attack. With proper selection of components, ambient temperature variations from −40° C. to +85° C. will not affect the electrical stability of the system, thus permitting it to be used in a variety of applications and environments. It has been found that silicon transistors provide the required temperature stability, as well as providing long life and reliability. Through the use of solid-state devices, only a relatively small power supply need be provided. Further, the system is compact and easy to handle, requiring little space for installation. A number of central station units may be mounted on a common panel and may share a common power supply. If desired, the audible alarms may be common to several units.

BRIEF DESCRIPTION OF THE DRAWINGS

The foregoing and additional objects, features and advantages of the invention will be seen in the following description of preferred embodiments thereof. The novel features which are characteristic of the invention are described with particularity in the appended claims, but for a complete and full understanding of the invention, reference will now be made to certain specific embodiments, selected for purposes of illustration and shown in the accompanying drawings, in which:

FIG. 6 illustrates a machine control circuit for use at the remote station for controlling and sensing the operation of a suitable operating mechanism;

FIG. 7 illustrates an alarm network for the base station monitor networks during a machine controlling operation;

FIG. 8 illustrates a further sensing means which may be superimposed on the output of the remote station circuitry of FIG. 3 for effecting additional monitoring operations; and FIG. 9 is a circuit diagram of a suitable meter for detecting the signals produced by the circuit of FIG. 8.

DESCRIPTION OF PREFERRED EMBODIMENTS

Figure 1:
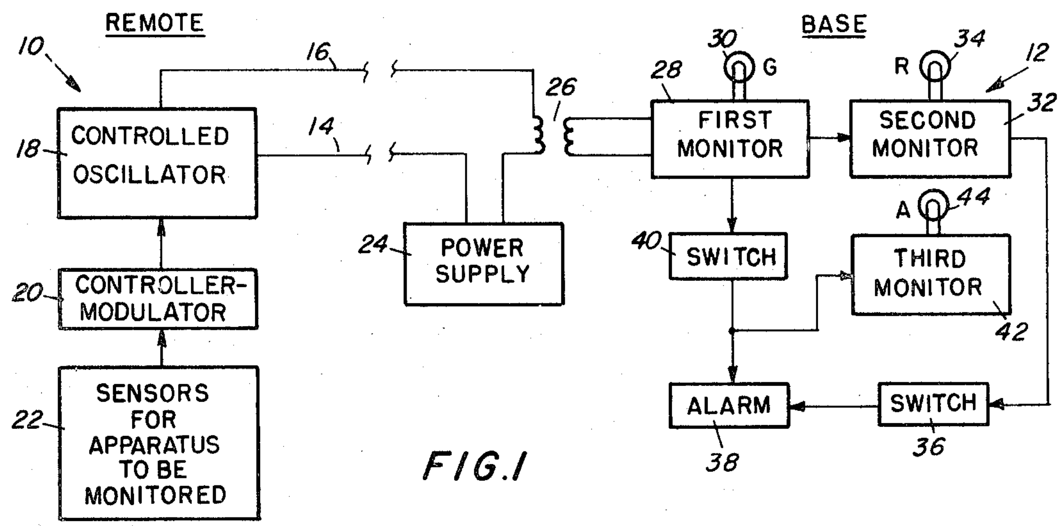
FIG. 1 is a block diagram of the monitoring and indicating system of the present invention.

Turning now to a consideration of the block diagram illustrated in FIG. 1, it will be seen that the present system comprises a remote station 10 and a base station 12 interconnected by lines 14 and 16. The interconnecting lines may be any suitable length, and it has been found that distances of up to 15 miles or more between the remote and base stations may be accommodated by the present system. The remote unit comprises an oscillator 18 which is capable of operating at a plurality of pulse rate levels, but which will provide a constant output at the selected level. A controller, or modulator, circuit 20 regulates the pulse rate of oscillator 18 and, although it is illustrated as a separate element in FIG. 1, the controller may comprise a part of the oscillator module. This controller operates in response to inputs from sensors 22, which are responsive to the apparatus which is to be monitored by the system to pulse modulate the oscillator and thereby provide an output that is uniquely representative of a monitored condition. These sensors may include a burglar alarm, fire alarm, or the like, or may be motion sensitive devices for detecting the operation of a machine of some type. Broadly speaking, then, the sensors may be arranged to respond to the status of a device and will change in a predetermined way when the condition being monitored changes; i.e., when a machine that is supposed to be moving stops, when a fire detector which is supposed to have an open circuit produces a closed circuit, when a rotating ventilator fan stops turning, etc. This change in the sensor serves to vary the state of the controller 20 and thus to change the output pulse rate of oscillator 18.

The output of oscillator 18 is applied to lines 14 and 16 in the form of pulses, the pulse rate carrying the desired information from sensors 22. These pulses are superimposed on the direct current power supplied to the remote station on lines 14 and 16 from power supply 24, which is located at the base station. The pulses are applied by way of transformer 26 to the first monitor network 28, which responds to various pulse rates to produce visual indications of the status of the remote equipment. The visible indications are provided by any suitable means, but preferably a lamp 30 is used, since the nature of the indications is suited to such a display. The lamp on the first monitor may be a bulb of some selected color for easy identification; for purposes of illustration it will be considered to be green. When the telemetering system is in a "normal," or "ready" mode, and operating properly, the output of oscillator 18 will have a pulse rate which will cause lamp 30 to blink at a moderate pace. A change in the apparatus being monitored which results in an increase in the pulse rate of the oscillator, or which produces an unmodulated, continuous, pulse output will cause the green lamp to glow steadily, and in this "active" mode of operation a second monitor 32 will respond, providing a visual indication of such a mode on a second indicator lamp 34. This second lamp may be considered a red lamp for purposes of illustration. Excitation of the second monitor may serve to operate a switch 36 to sound an alarm 38 to give an audible warning of the changed condition, unless this active mode is indicative of a desired event. In this latter case, the alarm circuit will be modified to respond when this second mode ends.

As long as the first monitor is receiving pulses in the normal manner, a switch 40, sensitive to the first monitor, will remain closed; however, a fault in the remote system or in lines 14 and 16 will cut off the input to the first monitor, permitting switch 40 to open and allowing a third monitor network 42 to become energized. This indicates a malfunction in the system and is made visible by energization of amber lamp 44. This lamp will also indicate a malfunction in either the first or the second monitor network and further may be used in combination with the green or red lamps to indicate a specific condition at the remote location. Thus, a plurality of indicator modules are provided which will give positive visual indication of the status not only of a condition or element to be monitored, but of the monitoring circuitry as well.

Figure 2:
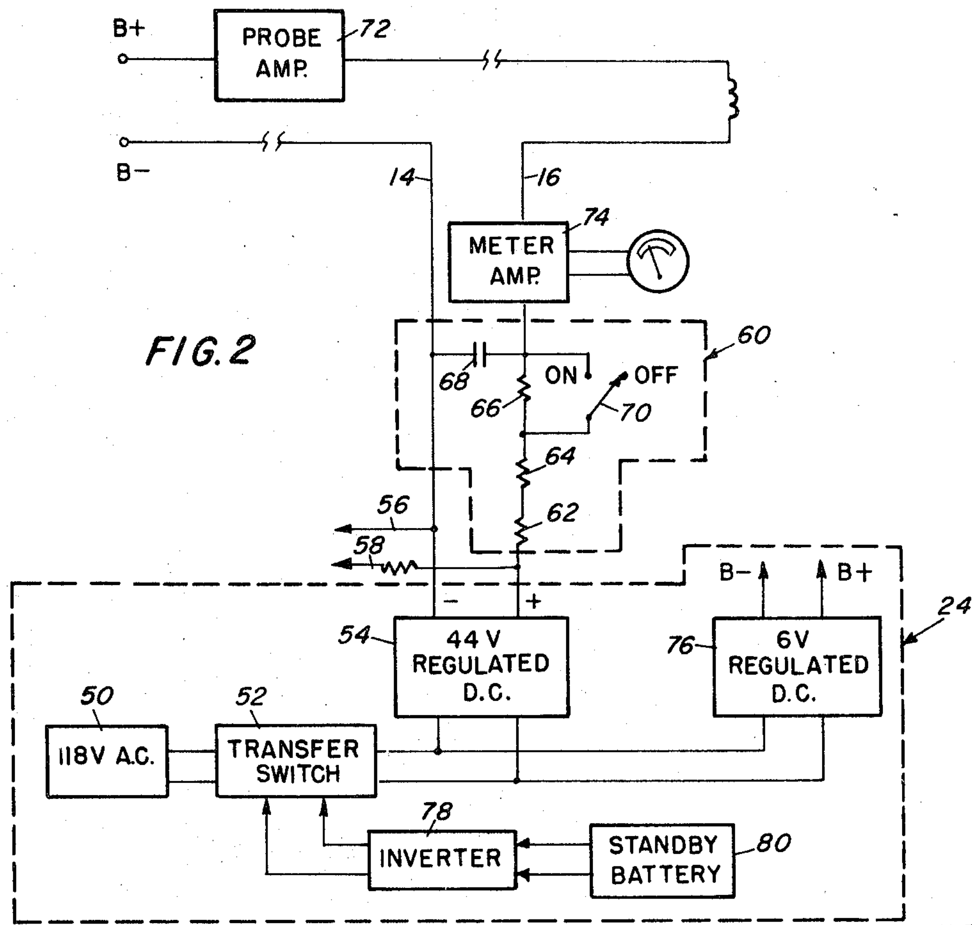
FIG. 2 is a more detailed block diagram of a power supply suitable for use with the system of FIG. 1.

FIG. 2 is illustrative of a power supply which is useful with the system of the present invention. Although it will be apparent that the present system can be operated as an alternating current system, it is preferred that direct current be used, and thus power supply 24 is illustrated as providing a regulated direct current to the system. An alternating current source 50 is connected through transfer switch 52 to a conventional rectifier and regulator circuit 54 which is adapted to provide 44 volts of regulated direct current. Voltage from regulator 54 is applied across lines 14 and 16 for use at the remote station; parallel remote stations may be connected to this same source of DC voltage by way of lines 56 and 58, if desired. A switching module 60 may be connected between voltage source 54 and lines 14 and 16 in certain embodiments of the invention. Switching module 60 comprises series resistors 62, 64 and 66 and a shunt capacitor 68 which serves to dampen switching transients. An on-off switch 70 shunts resistor 66, and operation of this switch serves to vary the current level supplied to lines 14 and 16. The resulting variation in current level may be used at the remote station to operate a solid-state switching device, in a manner to be described below. As will be explained with regard to FIGS. 8 and 9, additional detecting circuits may be included in the present system. Thus, a probe amplifier 72 may be included in line 16, the probe serving to sense a predetermined condition or value, such as fluid flow, and to produce an output which, again, is superimposed on the signals normally carried by lines 14 and 16. A meter circuit 74 may be provided to detect the output from the probe amplifier 72.

Direct current is supplied to the base station by way of rectifier and regulator 76 in the power supply network 24. In order to insure continuity of operation, a standby source of alternating current may be supplied to transfer switch 52 by way of an inverter 78 and a standby battery supply 80. Such standby supplies are well known in the art, and do not require further explanation. However, it is noted that since the system of the present invention draws only a very small current, a battery standby source is practical.

Figure 3:
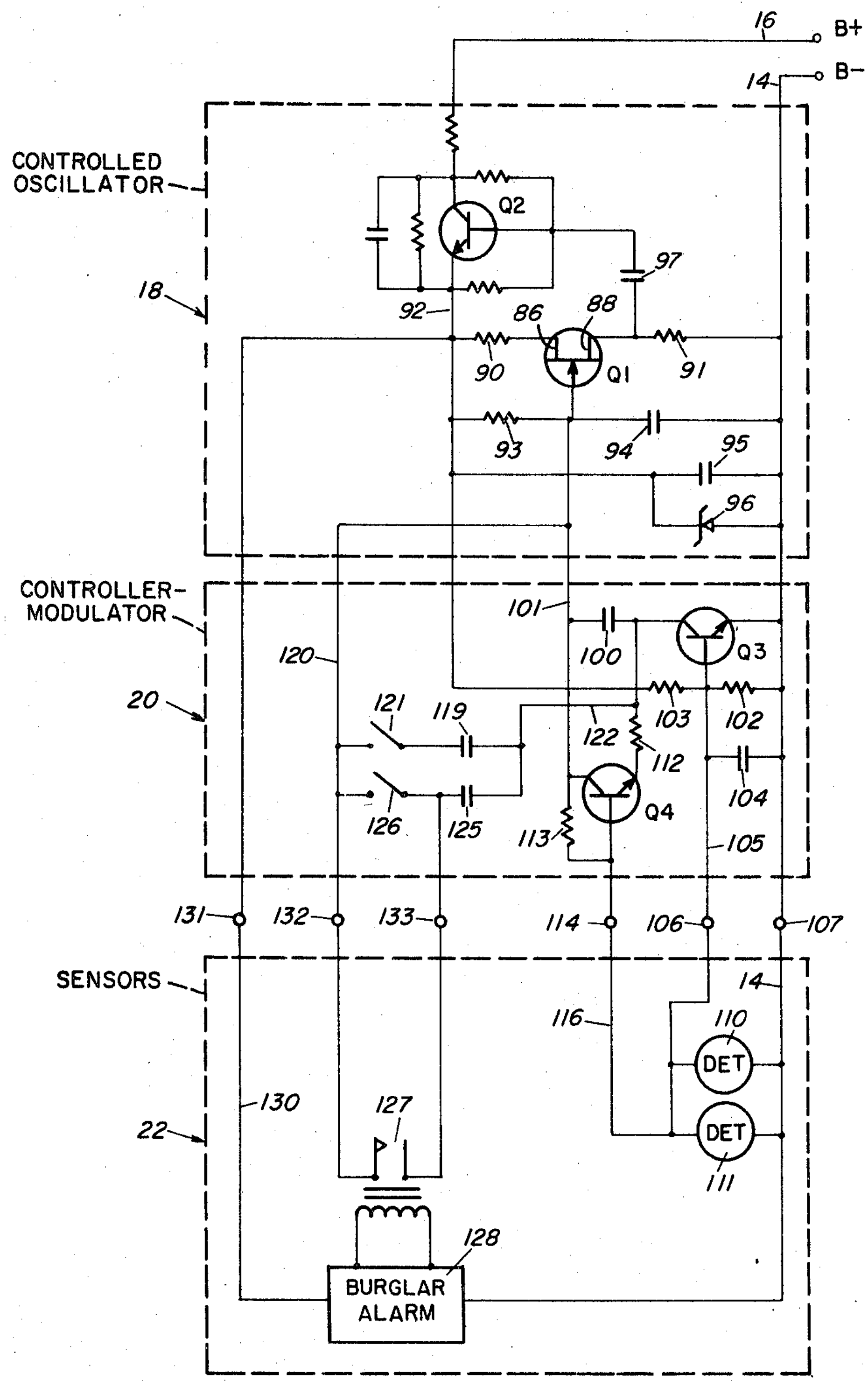
FIG. 3 is a circuit diagram of the remote station of the invention used in combination with a burglar or fire alarm system.

Turning now to a consideration of the remote unit, FIG. 3 illustrates the oscillator 18 and the controller module 20 in combination with a surveillance system such as a conventional burglar alarm or fire detectors. The oscillator basically consists of a unijunction transistor Q1 having its two base electrodes 86 and 88 connected by way of resistor 90 to output line 92 and resistor 91 to power supply line 14, respectively. The emitter of unijunction transistor Q1 is connected to the junction of a biasing resistor 93 and a biasing capacitor 94 which are connected in series between lines 92 and 14. A second capacitor 95 is connected in parallel with the series arrangement of resistor 93 and capacitor 94, and a Zener diode 96 is connected in parallel with capacitor 95 to limit the voltage appearing across capacitor 95 and to provide a constant voltage supply on line 92. As is well known in unijunction transistor oscillators, the voltage across capacitor 94 gradually builds at a rate determined by the time constant of the biasing circuit 93, 94, to the point where the transistor Q1 becomes conductive. This discharges capacitor 94 through Q1 and produces a voltage drop across load resistor 91, which voltage is applied through coupling capacitor 97 to the base of transistor amplifier Q2. Transistor Q2 amplifies the voltage so provided and applies it to line 16 for transmission to the base unit. Upon completion of the discharge of capacitor 94, Q1 stops conducting and capacitor 94 again begins to build up a charge. The rate at which capacitor 94 charges controls the frequency at which Q1 fires capacitor 94, and thus regulates the frequency of the signals applied to line 16 through amplifier Q2 under free-running conditions.

As is known, the frequency of a unijunction oscillator can be varied in numerous ways, as by changing the rate at which the voltage on its biasing capacitor builds up to the firing level. It has been found, however, that such changes in oscillator frequency do not always provide satisfactory results where information is to be transmitted with a high degree of accuracy, for changes in ambient conditions or in component characteristics can affect the signal being transmitted and thus vary the information being transmitted. In the present case, stepped signal values, or discrete pulse rates, are used in order to provide positive indications of changed conditions. The required pulse rate signals are obtained by means of a pulse rate timing circuit which modulates oscillator 18, the pulse rate timing circuit using suitable transistor switches to periodically shunt the firing circuit of the unifunction oscillator. The pulse rate timing circuit may itself be varied to permit selection of discrete pulse rates for the oscillator output whereby the repetition rate of the output pulses transmits information concerning the condition of the system or apparatus being monitored. In this manner, changes in component characteristics due to ambient conditions have little effect on the transmitted signals.

Selection of the pulse rate output for oscillator Q1 is carried out in controller 20. A transistor switch Q3 is connected in series with a timing capacitor 100 between line 14, which may be considered a ground line, and line 101, which is connected to the junction of resistor 93 and capacitor 94, and thus is connected to the emitter of Q1. When transistor Q3 is conductive, it connects capacitor 100 between lines 101 and 14, in parallel with capacitor 94. Capacitor 100 is also connected across the collector-emitter circuit of a timing transistor Q4 which is in series with the collector-emitter circuit of transistor Q3. Capacitor 100 begins to charge when Q3 becomes conductive, and when this charge builds up to a high enough value, transistor Q4 is fired, providing a path from line 101 through Q4 and Q3 to ground line 14 which shunts capacitor 94 and prevents Q1 from oscillating, as will be described hereinbelow, and which shunts capacitor 100 to ground to discharge it. Q4 then is cut off, capacitor 100 begins to charge, Q1 starts to oscillate again, and the cycle is repeated. The base of Q3 is connected to lines 14 and 92 by way of resistors 102 and 103, respectively, with capacitor 104 being connected between the base electrode of Q3 and line 14, in parallel to resistor 102. The base of Q3 is connected by way of line 105 to terminal 106, for connection to the sensor circuitry of module 22. Similarly, line 14 is connected to terminal 107.

A first surveillance or supervisory, loop may be connected across terminals 106 and 107 in the sensor circuit. A break in the portion of the surveillance loop connected to terminal 107 would open line 14, which is the ground return line for the system, and this would produce a malfunction signal at the base station. Detector means such as those illustrated at 110 and 111 in sensor 22 may be connected between terminals 106 and 107. These detectors may be heat-sensitive devices for a fire-warning system or any suitable conventional detector which responds to a specified condition to provide a short circuit. Such a short circuit created by one or more of the detectors may be termed a fault condition, and would shunt resistor 102 and capacitor 104 in the base of transistor Q3, removing its bias and causing it to cut off. This would remove capacitor 100 and transistor Q4 of the pulse rate timing circuit from the emitter circuit of oscillator Q1 and would allow Q1 to oscillate continuously at its free-running value, as determined by capacitor 94. Capacitor 100 is shunted by transistor Q4, the emitter of which is connected through resistor 112 to the collector of Q3 and the collector of which is connected to line 101. The base of Q4 is connected to line 101 and one side of capacitor through bias resistor 113 and is connected to terminal 114 for connection to the sensor module 22. A second surveillance loop 116 is then connected between terminals 106 and 114, and as long as this second surveillance loop remains intact, the base voltage will be determined by resistors 113 and 102, acting as a voltage divider between lines 14 and 101. The base voltage on Q4 will thus remain low and conduction of Q4 will be controlled by the voltage across capacitor 100, as will be described. If the second surveillance loop should break, resistor 102 will be removed from the bias circuit, and the base voltage applied to Q4 through resistor 113 would be sufficiently high to permit Q4 to conduct, the voltage for this purpose being derived from line 16 by way of line 92, resistor 93 and line 101. Steady conduction of Q4 together with continued conduction of Q3 provides a shunt across both capacitors 94 and 100 through resistor 112, preventing the capacitors from charging, and stopping oscillation of Q1 to produce a zero pulse rate output. However, even under this condition the system would be capable of responding to the operation of detectors 110 and 111, for a short circuit in one of these detectors would cut off transistor Q3, returning the oscillator Q1 to its free-running state under the control of capacitor 94 alone. Thus, it will be seen that the first surveillance loop, which includes detectors 110 and 111, and the second surveillance loop, which includes wire 116, are capable of responding to various conditions to modulate the output of oscillator Q1.

With the surveillance loops intact and the detectors open circuited, the remote unit will operate in its normal mode. Thus, transistor Q3 is conducting, receiving its base bias from line 92 through resistor divider 103, 102. The voltage on line 92 is applied by way of resistor 93 to capacitor 94, causing this capacitor to charge to the firing voltage for the unijunction transistor Q1, and to capacitor 100, causing this latter capacitor to charge toward a voltage value which will bias transistor Q4 into conduction. Capacitor 94 charges through resistor 93 much more quickly than does capacitor 100, because of the resistance of the collector-emitter circuit of transistor Q3 in the charging circuit of capacitor 100; therefore capacitor 94 will charge and fire Q1 a number of times before capacitor 100 reaches its full charge so that Q1 will oscillate. When transistor Q4 is biased into conduction by the charge on capacitor 100, Q4 shunts capacitors 94 and 100 to line 14 through transistor Q3, stopping the oscillation of Q1 and discharging both capacitors through resistor 112 and transistor Q3. Transistor Q4 then becomes nonconductive, and the cycle repeats. This cycle of operation is termed the pulse rate of the circuit.

Two additional control capacitors are illustrated in controller 20, one of which is indicated as being manually operable and the other of which is either manually operable or responsive to a sensing mechanism such as a burglar alarm. The first capacitor 119 may be connected in shunt with capacitor 100 by way of line 120, which is connected to previously described line 101, manually operable switch 121, the capacitor 119, and line 122. When transistor Q3 is conducting, closure of switch 121 places capacitor 119 in shunt with capacitor 100 to provide a corresponding change in the pulse rate of the circuit. In similar manner, the second capacitor 125 may be connected in shunt with capacitor 100 by means of a manually operated switch 126, again effecting a distinctive change in the pulse rate of the circuit.

Capacitors 119 and 125 may serve a number of functions. For example, they may be manually operated by personnel at the remote location to provide specified signals to personnel at the base station. Alternatively, they may be used in conjunction with apparatus to be monitored to provide status signals to the base unit. This latter arrangement is illustrated with respect to capacitor 125 which is connected in series with a solenoid operated switch 127. Switch 127 is in parallel to manually operable switch 126 and is responsive to the output derived from a conventional burglar alarm system 128. Occurrence of an alarm, or fault, condition energizes the output of the burglar alarm 128 to close switch 127. This places capacitor 125 in parallel with capacitor 100, so that when transistor switch Q3 is conductive there will be produced a unique and identifiable output pulse rate on line 16.

By way of example, and to assist in understanding the operation of the base station monitor networks, it has been found that suitable operation of the remote unit is obtained when oscillator Q1 is free running under the control of capacitor 94 at, for example, 120 cycles per second. This free-running operation occurs when transistor Q3 is nonconductive so that neither the timing capacitor 100 nor the timing transistor Q4 can affect the operation of the oscillator. When Q3 is conductive, capacitor 100 is provided with a charging path; when it has charged to a predetermined value, it biases transistor Q4 on to thereby provide a shunt across capacitor 94 and turn transistor Q1 off. Capacitor 100 then discharges, causing Q4 to become nonconductive, removing the shunt from capacitor 94 and allowing Q1 again to oscillate until capacitor 100 has recharged to the point where Q4 again fires. The charging and discharging of capacitor 100 and the consequent conduction and nonconduction of transistor Q4 thus modulates the output of oscillator Q1, producing a series of output pulses the rate of which will be dependent upon the rate at which capacitor 100 charges and discharges. In a typical example, the value of capacitor 100 may be adjusted to produce an output pulse rate from oscillator Q1 of 1 pulse per second. The operation of any sensor to cut off transistor Q3 will immediately return oscillator Q1 to its free-running state with an output of 120 cycles per second and a continuous pulse rate. When capacitor 125, for example, is connected in parallel with capacitor 100, as by energization of a burglar alarm, transistor Q4 will be switched between its conductive and nonconductive states at a rate dependent upon the rate at which the two parallel capacitors will charge to the firing voltage of Q4. By proper selection of the value of capacitor 125, the pulse rate of the timing circuit may be reduced from one pulse per second to, for example, one pulse every 2 seconds. Similarly, the addition of capacitor 119 to the timing circuit may further vary the rate of pulse modulation of oscillator Q1.

It will be seen from FIG. 3 that all the power required for the operation of the remote portion of the present system is derived from the direct current applied to lines 14 and 16. Thus, the oscillator 18 and its associated amplifier Q2 as well as the controller 20 receive all necessary power from lines 14 and 16. Similarly, the sensors 22, which in this case are fire detectors or burglar alarms, also derive their power from lines 14 and 16, the detectors 110 and 111 being connected between lines 14 and 116, in the manner described above, and burglar alarm 128 being connected between line 14 and 130. Line 130 is connected by way of terminal 131 to positive line 92 and through amplifier Q2 to the positive supply line 16. It will be noted that sensor 22 is connected to controller 20 by way of terminals 106, 107, 114, 131, 132 and 133, the latter two terminals serving to connect burglar alarm switch 127 in parallel with the manually operated switch 126. These terminals permit connection of various sensors to the controller circuit. Alternatively, control mechanisms or circuits of various types may be connected to the system as will be described hereinbelow.

Figure 4:
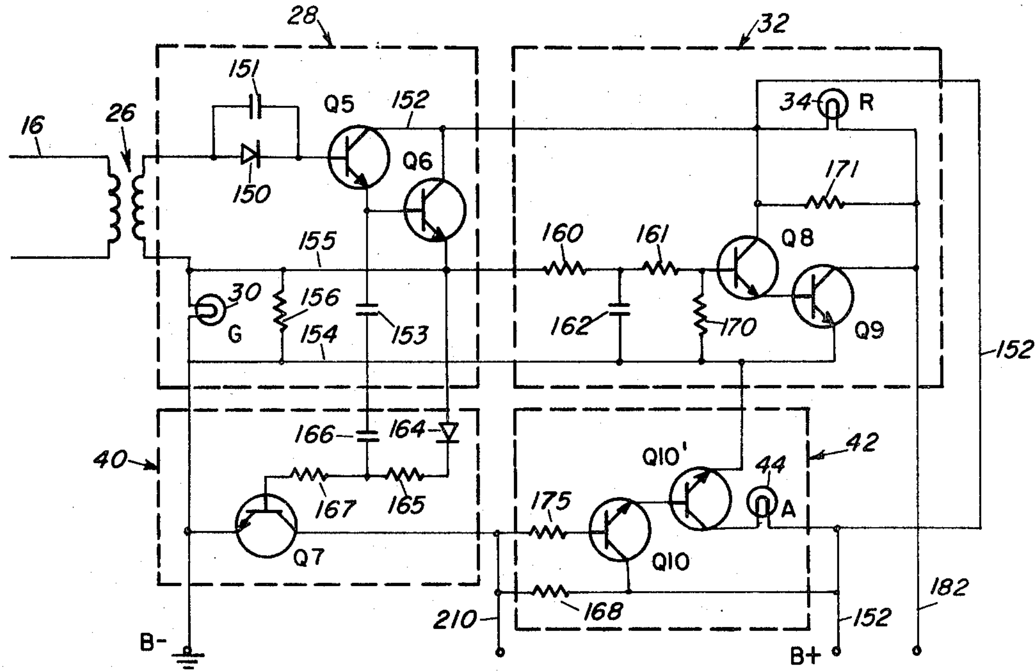
FIG. 4 is a circuit diagram of the three base station monitoring networks.

The output pulses from the oscillator 18 are carried by line 16 to the base unit illustrated in FIG. 4. These signals are applied by way of transformer 26 to the input of the first monitor 28. Monitor network 28 is a solid-state module which receives input pulses from transformer 26 and applies them by way of diode 150 and parallel capacitor 151 to the base of a first transistor amplifier Q5. The collector of Q5 is connected to a positive power supply line 152, while its emitter is connected through capacitor 153 to a negative supply, or ground, line 154. The emitter is also connected to the base of a second transistor amplifier Q6 having its collector connected to line 152 and its emitter connected by way of line 155 to the other side of the secondary of transformer 26. The green indicator lamp 30 is connected between line 155 and ground, with a resistor 156 connected in parallel to it to allow the circuits to function in the event the bulb burns out. Receipt of a pulse of the 120 Hz. signals generated at the remote station at the base of Q5 causes Q5 to conduct and charge capacitor 153. The current flowing in the emitter circuit of Q5 causes Q6 to become conductive. If the pulses received by the monitor network 28 are at a relatively low rate, as, for example, 1 pulse per second, conduction of Q5 and Q6 will be intermittent. This intermittent output from transistor Q6 will be applied by way of line 155 to a timing network made up of series resistors 160 and 161 and shunt capacitor 162, but will be insufficient to charge capacitor 162. Since indicator lamp 30 is in series with the secondary of transformer 26, these intermittent pulses will also cause lamp 30 to light intermittently, at the same rate as the received pulses. It will be noted that the cascade arrangement of Q5, Q6 is made necessary because of the use of silicon transistors; other types will not require this arrangement, but would permit a single transistor to provide the needed switching and amplifying functions.

The intermittent output of Q6 in response to the 1 pulse per second input is applied by way of diode 164 and resistor 165 to one side of a capacitor 166, the other side of which is connected to ground. This intermittent voltage is sufficient to charge capacitor 166, thus producing a steady voltage through resistor 167 to the base electrode of transistor switch Q7. The emitter of Q7 is connected to ground line 154, while the collector is connected by way of resistor 168 to the positive supply line 152. As long as Q7 remains conductive, its collector will be effectively grounded, and no voltage will be applied to the input of third monitor network 42.

If the signal pulses applied to transformer 26 vary from the 1 pulse per second rate, defined as the normal, or ready condition, the status of the monitoring networks will be changed from that described above. As has been indicated, the ready condition involves the intermittent blinking of green lamp 30, the pulse rating being such as to hold Q7 conductive to prevent an input to the third monitor 42 and being insufficient to charge capacitor 162, thus preventing the second monitor from becoming energized. If the pulse length is increased, so that the base station sees only a continuous, unmodulated, free-running signal of 120 cycles per second, for example, transistors Q5 and Q6 will turn on 120 times per second. In addition, lamp 30 will blink on 120 times per second and will thus appear to glow steadily. This increased pulse length will maintain the charge on capacitor 166 and hold transistor Q7 conductive. In addition, the continuous pulse will provide sufficient voltage to cause capacitor 162 to become conductive, thus applying a voltage through resistor 161 and across resistor 172 to the base electrode of amplifier Q8, the collector of which is connected to positive supply line 152. The emitter of Q8 is connected to the base electrode of switch Q9, causing it to turn on and close its collector-emitter path from positive supply line 152, through red lamp 34, its collector, its emitter to ground line 154. Completion of this circuit causes red lamp 34 to glow steadily. A resistor 171 is connected across lamp 34 to provide continuity of the circuit in the event the lamp should burn out. Thus, the existence of a 120 cycle per second signal on line 16 is positively indicated by the glowing of green lamp 30 and red lamp 34.

A reduction in the pulse rate of the signal appearing on line 16 will also change the mode of operation of the indicators in FIG. 4. If the pulse rate slows down from the nominal 1 pulse per second to, for example, 1 pulse every 2 seconds, capacitor 162 will be unable to charge, and red lamp 34 will remain off. The green lamp 30 will blink slowly, and while it is turned on, transistor Q6 will be charging capacitor 166 to hold Q7 nonconductive. However, the length of time between pulses is so large at this repetition frequency that capacitor 166 will discharge between pulses to allow Q7 to become nonconductive. In addition, if a fault should occur in the remote unit or in the connecting lines 16 and 14 so that no pulses are received at transformer 26, Q7 will also become nonconductive because of the discharge of 166. Whenever Q7 is turned off, the voltage appearing across resistor 168 is applied through resistor 175 to the base of amplifier Q9, causing Q9 to conduct. The collector of Q9 is connected to positive supply line 152 and its emitter is connected to the base of transistor Q10, the emitter of which is connected to ground. The collector of Q10 is connected through amber indicator lamp 44 to positive supply line 152, and conduction of Q10 illuminates lamp 44. Therefore, any state of nonconduction in Q7 results in energization of amber lamp 44. If it is a low pulse rate (e.g., one pulse every 2 seconds) that is causing Q7 to become nonconductive, the result will be a slow blinking of amber lamp 44. Since, under this condition, green lamp 30 is conducting during each pulse and lamp 44 is illuminated during the pause between successive pulses, the result will be an alternate blinking of the green and amber lights. If it is a loss of signal that causes Q7 to be nonconductive, then amber lamp 44 will glow steadily.

It will be apparent, then, that energization of the various lamps in the indicators of FIG. 4 depends upon the pulse rate at which oscillator 18 is modulated, and this rate is, in turn, governed by the particular timing capacitors which are connected in circuit with timing transistor Q4 and thus with the unijunction oscillator transistor Q1. Each change in the timing circuit for Q1, as represented by capacitors 100, 119 and 125, may be identified with a specific event in the apparatus being monitored, and thus will produce in the base station a specific indicator light energization which will be a function of the monitored function. For example, when the system is used in conjunction with fire detectors such as those indicated at 110 and 111 in FIG. 3, the proper operation of these detectors, i.e., open circuit between terminals 106 and 107, will cause transistor switch Q3 to be conductive to place capacitor 100 in the timing circuit of the oscillator. This will cause transistor Q4 to become periodically conductive and nonconductive which will, in turn, modulate the oscillator Q1 to produce a pulse rate of 1 pulse per second, causing the green light 30 to blink and indicating normal operation of the fire detector system. If a fire, for example, should short out one of the detectors, then transistor switch Q3 would become nonconductive, capacitor 100 would be removed from the timing circuit and transistor Q1 would oscillate continuously at 120 cycles per second, causing green lamp 30 to glow steadily and illuminating red lamp 34, causing it also to glow steadily to indicate an alarm, or fault condition. If the first surveillance loop, which includes the negative supply line in the remote circuitry, is broken at any point, that is, if line 14 is broken, the pulse rate becomes zero and the amber light at the base station will become illuminated to indicate a malfunction. The second surveillance loop defined by wire 116 is connected to the base of Q4 and, as long as this loop is intact and Q3 is conducting, insufficient voltage is applied to Q4 to cause it to conduct. However, if supervisory loop 116 is broken, as for example, if a door or window in a protected area is opened without authorization, the base voltage on Q4 will rise sufficiently to cause Q4 to conduct. With Q4 and Q3 both conducting, the capacitor timing and biasing networks of the oscillator are shunted to ground through resistor 112, the oscillator stops producing an output, and the amber light 44 goes on to indicate a malfunction which, in this case, is an alarm condition. If, during the time that surveillance loop 116 is broken, one of the fire detectors 110, 111 should short circuit, the base voltage would be removed from Q3, opening the shunt to ground through transistor Q4, and the oscillator would produce a 120 pulse per second output under the control of capacitor 94. This would, of course, produce a steady glow in the red and green lamps 34 and 30, representing a fire alarm.

Figure 5:
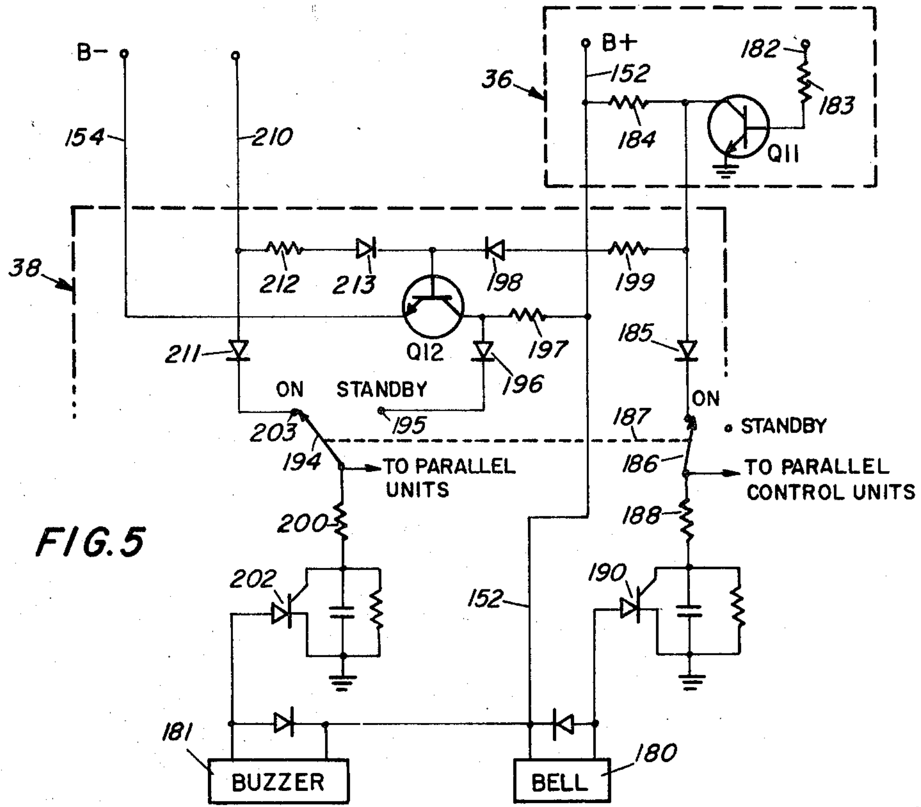
FIG. 5 illustrates an audible alarm system suitable for use with the indicator networks of FIG. 4.

In addition to the visual indicators of FIG. 4, the present invention provides an audible alarm system which is also responsive to pulse rate, and which is illustrated in FIG. 5. Since a steady glow in red lamp 34 is indicative of an active condition, which may be considered an alarm mode, the current through this lamp may be used to operate a switch 36 which, in turn, activates a bell 180, a buzzer 181 or their equivalents. During a normal condition, or mode, when only green lamp 30 is blinking, transistor Q9 (FIG. 4) will be nonconductive, permitting a bias voltage to be applied from positive supply line 152 through resistor 171 and line 182 (connected to the collector of Q9), through resistor 183 to the base of transistor Q11. The collector of Q11 is connected to positive supply line 152 through resistor 184, and its emitter is connected to ground. In this condition, Q11 is conductive, shunting the voltage across resistor 184 to ground so that the alarm 38 is not energized. Upon occurrence of a fire signal or the like which produces a steady 120 cycle per second signal on line 16 and causes red lamp 34 to light, transistor Q9 becomes conductive, shunting the voltage appearing on the base of Q11 to ground and causing Q11 to become nonconductive. The voltage across resistor 184 may then be applied through diode 185, switch arm 186 of two-position toggle switch 187, and through resistor 188 to the gate electrode of a silicon-controlled rectifier or equivalent solid-state switching device 190. This causes SCR 190 to become conductive, completing a current path from positive supply line 152 through bell 180 and the anode-cathode path of SCR 190 to ground, thereby energizing bell 180 to provide the required audible alarm. In response to this alarm signal, the operator at the base station may switch toggle 187 to the standby position, opening the bell circuit at switch arm 186 and silencing the bell. Movement of toggle 187 to standby will place its other switch arm 194 in contact with terminal 195, switch arms 186 and 194 being mechanically connected to operate together and will activate an acknowledgement circuit which functions in the manner known in the art to produce a second alarm when the system has been restored. Terminal 195 is connected through diode 196 to the collector of a transistor switch Q12, the collector of Q12 also being connected through resistor 197 to positive supply line 152. The Q12 emitter is connected to negative supply line 154 and its base is connected through diode 198 and resistor 199 to the collector of Q11. During the time that the red lamp 34 is on and Q11 is nonconductive, the voltage across resistor 184 will be applied to the base of Q12, causing Q12 to conduct and short circuit the voltage on resistor 197 to ground. Thus, no voltage will appear at the collector of Q12 during that time. When the remote condition is corrected, so that the monitor networks are no longer in their active mode (e.g., a fire alarm signal is no longer being given), the pulse rate will return to 1 pulse per second and the red indicator lamp will be turned off. The green light will start blinking and Q11 will become conductive to remove the voltage from the base of Q12. Q12 will stop conducting and a voltage will appear at its collector which will be applied through diode 196 and switch arm 194, through resistor 200 to the gate electrode of a solid-state switching device such as silicon-controlled rectifier 202. Conduction of SCR 202 will complete a circuit from positive supply line 152 through buzzer 181 and the anode-cathode circuit of SCR 202 to ground, thus sounding the buzzer to provide an audible indication that the system has returned to normal. The operator at the base station may then return toggle 187 to its on position, closing the circuit through switch arm 186 to SCR 190 and placing switch arm 194 in contact with terminal 203, thus placing the alarm circuit again in condition to respond to a fire signal, or other corresponding "active" signal from the remote unit.

If trouble should occur in the connecting lines 14 and 16 or in the surveillance loop at the remote module so that the amber light is turned on, the resultant voltage at the collector of Q7 will be applied by way of line 210 and diode 211 through switch arm 194 to the gate electrode of SCR 202, causing the buzzer to sound. The voltage on line 210 will also be applied by way of resistor 212 and diode 213 to the base of Q12, causing Q12 to become conductive and removing the voltage from its collector. The operator at the base station may then shift toggle 187 so that switch arm 194 is in contact with terminal 195, thus silencing the buzzer. When the trouble has been repaired, the 1 pulse per second signal will be returned to the line, and the green dial light 30 will begin to blink normally. Transistor Q7 will become conductive, removing the voltage from line 210 and turning off the amber light. Q12 returns to its nonconductive state and restores its collector voltage (which appears across resistor 197). With switch arm 194 in contact with terminal 195 (standby), this voltage will cause the buzzer to sound, giving audible indication that the system has been returned to normal. Toggle 187 may then be returned to its on condition for normal monitoring operation.

The foregoing has indicated the operation of the alarm system in response to a fire alarm signal or a trouble signal. If a burglar alarm, such as that indicated at 128 in FIG. 3, or some equivalent alarm system is used to switch capacitor 125 into the timing circuit of the modulator for oscillator Q1, the resultant output from the remote unit will be reduced in frequency to approximately 1 pulse every 2 seconds, for example. As has been indicated, this reduced pulse rate will cause the green and amber lamps 30 and 44 to blink alternately. Since the intermittent blinking of amber lamp 44 is the result of periodic cutting off of transistor Q7, it will be apparent that there will be corresponding voltage pulses appearing on line 210 which will be applied through switch arm 194 to cause buzzer 181 to sound intermittently, each time the amber light is illuminated. It will be observed that the same type of signal may be generated at the remote station by the manual closing of switch 126 in controller 20. This manual switch may thus be conveniently used by a repairman or other personnel located at the remote area for signalling the base station. Similarly, capacitor 119 may be connected in the timing circuit of the oscillator by means of manually operable switch 121 to produce another pulse rate which may, for example, cause the green and amber lights to blink alternately more slowly.

Thus, it will be seen that the audible alarm circuit is arranged to provide an audible response which is indicative of the type of condition being sensed at the remote unit. The audible alarm may be switched to standby while the remote condition is being corrected, and when correction has been accomplished the audible alarm will again sound to indicate a return to normal. The alarm circuit consists of two alarms, the first being responsive to the second (red) monitor network, and the second being responsive to the third (amber) monitor network. The second alarm has a standby position to provide an acknowledgement circuit which serves to indicate when the condition which excited the second or third monitor networks has been corrected, and the base system is to be reset.

In addition to the general surveillance functions described above, the present system is readily adapted to the remote control of machine operations, permitting remote turning on of machinery, monitoring of its operation and emergency shutdown. In addition, the system will accommodate superimposed signals representing flow measurements such as the flow of gas, oil, water or other fluids, stress measurements, measurement of airflow velocity, such as in a coal mine ventilation system, and the like.

Monitoring of machine operation is accomplished preferably through the detection of machinery motion such as rotation or reciprocation. Malfunction of the machine would cause a change in the indicator lights with accompanying audible alarms. By switching the alarm system to standby, the operator at the base station may check the continuity of the control system, and if it is indicated as operating properly, the operator will know that the malfunction is elsewhere. When the machine is restored to normal operation, the audible alarm will again sound and the base station is again returned to its normal operating condition. Thus, the operator at the base station can at all times determine whether he has a clear control and monitoring circuit to the remotely located machinery.

Turning now to FIG. 6, a modified form of sensor 22 particularly designed for machine control and monitoring is illustrated. With this system, the power control module 60 (FIG. 2) would be used so that when resistors 62, 64 and 66 are in series with the DC supply lines 14 and 16, a slightly reduced voltage is provided. Closure of on-off switch 70 shunts resistor 66 to raise the positive supply voltage on line 16, which is illustrated as the B+ line in FIG. 6. This increased voltage is applied through a resistor 220 and diode 221 to the gate electrode of a suitable solid-state switching device such as a silicon-controlled rectifier 222. The increased voltage causes the SCR 222 to conduct, completing a machine power loop 224 which includes the secondary of an AC power supply transformer 226, coil 227 of a switch relay 228, the anode-cathode circuit of SCR 222, ground return line 229 and diode 230. Conduction of SCR 222 thus energizes switch relay 228 to close switch arm 231 and energize the machine 232 to be controlled and monitored.

Energization of machine 232 will produce a motion which may be detected by the sensor circuit 22. As illustrated in FIG. 6, a magnetic reed circuit is utilized in conjunction with a moving permanent magnet to produce the required sensing. A permanent magnet 240 is mounted on a rotating or reciprocating portion of machine 232 and is arranged to pass in sequence first past magnet reed switch 241 and then past reed switch 242. As the magnet nears reed switch 241, its contacts 243 close, completing a circuit from positive supply line 16 through resistor 244, contacts 243, resistor 245 and storage capacitor 246 to negative supply line 14. During the time that contacts 243 are closed, a charge builds up on storage capacitor 246. As the magnet moves away from switch 241, contacts 243 open, the stored voltage remaining on capacitor 246. Movement of magnet 240 toward reed switch 242 causes contacts 247 to close, forming a discharge path for capacitor 246 through the closed contacts 247 to a second storage capacitor 248. The storage of a voltage on capacitor 248 applies a bias through resistor 249 to the base of transistor switch Q13, causing it to conduct. The emitter of Q13 is connected to ground line 14, while its collector is connected by way of terminal 106 to the base of transistor Q3 in the control network of FIG. 3. At the same time, this voltage is applied by way of terminal 114 to the base of transistor Q4. This voltage causes transistor Q4 to conduct, but conduction of Q13 short circuits the base bias on transistor Q3 and switches it to its nonconductive state, thus opening the emitter collector circuit of Q4 and leaving capacitor 94 to control the frequency of oscillator Q1. As has been explained, with only capacitor 94 in circuit with oscillator Q1, the oscillator is free running at 120 cycles per second, a frequency which causes both the green and the red lamps 30 and 34 at the base station to glow continuously. Thus, with the proper timing of the operation of reed switches 241 and 242, indicator lamps 30 and 34 are caused to glow, giving a positive indication of an active status at the remote station, and thus of proper machine operation.

If the machine malfunctions in some way, so that the motion of magnet 240 varies from the sequence which maintains Q13 in a conductive state, or if the machine stops entirely so that no voltage is applied across storage capacitor 248, this capacitor will discharge, returning Q13 to its nonconductive condition and shifting Q3 to a conductive state. This will connect the oscillator modulating network consisting of capacitor 100 and transistor Q4 in parallel with capacitor 94, thereby causing the oscillator to be pulse modulated and changing the output of the remote unit to 1 pulse per second. As before, this will shift the indicator lights at the base stations so that the green lamp 30 pulses intermittently and the red light will be turned off. The pulsing green light indicates a ready condition; i.e., that the control and sensing circuitry is operating properly and that the malfunction has occurred in the machine itself. The operator at the base station may then shut down the machine by opening switch 70 (FIG. 2).

The alarm system for use with the machine control system of FIG. 6 differs from the alarm circuit described in FIG. 5. This modified alarm circuit is illustrated in FIG. 7, to which reference will now be made. As in FIG. 5 embodiment, the alarm circuit of FIG. 7 utilizes switch 36 and its corresponding transistor Q11 for response to the condition of the second monitor network and red indicator lamp 34. When lamp 34 is glowing, indicating proper operation of the machine being monitored, no voltage is applied to the base of transistor Q11 and this latter transistor is nonconductive. This permits the voltage appearing across resistor 184 to be applied through diode 270 to the standby terminal 271 of toggle switch 272. The voltage across 184 is also applied by way of resistor 273 and diode 274 to the base electrode of transistor switch Q14, the emitter of which is connected to ground line 154 and the collector of which is connected through resistor 275 to the positive supply line 152. The voltage thus applied to the base of Q14 makes this transistor conductive, dropping its collector voltage to ground level. This is the operating condition for this circuit which remains until the red lamp goes off. When this happens, Q11 becomes conductive, removing the bias voltage from the base of Q14 and turning Q14 off. The voltage which then appears at the collector of Q14 is applied through diode 276 to the on terminal 277 of toggle switch 272 and thence through resistor 278 to the gate electrode of a silicon-controlled rectifier 280. This causes rectifier 280 to become conductive, closing a circuit from positive supply line 152 through buzzer 281 and SCR 280 to line 154, thus sounding the buzzer. The operator at the base station may then shift switch arm 272 to the standby position until a repair of the remotely located machine is effected. When this happens, the red light goes on, Q11 stops conducting and the voltage across resistor 184 is applied through switch arm 272 to the SCR 280, sounding the buzzer. The operator may then shift the switch arm to the on condition, restoring the circuit to its normal condition.

If, upon occurrence of a malfunction in the machine, the operator at the base station opens switch 70 to turn off the machine, buzzer 281 will not be able to respond to repair of the malfunction automatically; i.e., the machine will not run, so red lamp 34 will not light. Therefore, the manually operable switches 121 and 126 which permit connection of capacitors 119 and 125, respectively, into the timing circuit of oscillator Q1 are particularly useful in this embodiment, for they permit a repairman at the remote area to send a signal to the base location by switching capacitors 119 or 125 into the circuit. As previously indicated, capacitors 125 may produce a pulse rate which will cause the green and amber lamps to blink alternately. Capacitor 119 may be selected to have a value which will produce the lowest rate of pulse modulation of the unijunction transistor oscillator. This capacitor may be selected so as to produce relatively long pulses, widely spaced. When this capacitor is inserted in the circuit by closing switch 121, the relatively long pulse will cause the green lamp to turn on and then the red lamp to turn on briefly. The space between succeeding pulses again will cause the amber lamp to light, thus producing a green-red-amber sequence of blinking lights. This sequence of operation will cause buzzer 281 to sound intermittently when switching 272 is in the standby position. The intermittent blinking of all three lights might be used by personnel at the remote location to signal the base station to start the machinery by closing switch 70. If this is done, normal light indications of machinery operation will override the service indications. If the repair personnel desire to shut down the equipment at the remote location, switch 126 might be used to indicate by alternately blinking green and amber lamps that the machine has been shut down on purpose. Upon receipt of such a signal, the operator at the base location would place switch 272 in standby, so that when the machine is restored to normal operation at the remote location, the buzzer will sound to warn that the system is again active, and the green and red lamps will go on.

It will be seen that if the machinery, once placed in operation, ceases to operate properly because of a malfunction in the machine, the red indicator lamp 34 will be extinguished and an audible buzzer will sound. The operator at the base station would then change switch 272 to its standby position and, if green lamp 30 starts blinking, the operator is assured that the entire control system to the remote area is functioning properly. If the green and red indicators are both out, the amber lamp will light, indicating a malfunction in the control circuitry.

Although the circuit of FIG. 6 is described with reference to the motion of a machine, it will be apparent that this sensor circuit could be replaced with a corresponding circuit designed to indicate liquid or gas flow, for example. Any suitable detector which, upon occurrence of a malfunction will cut off transistor Q13, or otherwise open the circuit between terminals 106 and 107 formed through the collector-emitter circuit of Q13 may be used with this system.

It will be apparent that numerous modules, both remote and base, can be used in conjunction with a single installation, with various modules being used to measure or detect specific functions of the installation. One example of a suitable application for this type of module is in conjunction with conveyors used in coal mines, where one of the problems encountered is the use of four or more conveyors converging into a common carrier. Such an arrangement can create overloading. To avoid this, weight limiting switches can be connected across terminals 106 and 107 and when the limiting switch of any one of the conveyors closes because of an overload condition the operator at the base station will immediately receive a suitable warning signal, enabling him to shut down the overloaded conveyor from the remote location. Since the remote modules require no local power source, transferring of the conveyor systems from one location to another poses no particular problems insofar as the telemetry is concerned.

Signals may be superimposed on line 16 connecting the remote unit to the base unit through the use of a probe amplifier 72 (FIG. 2). This probe is shown in detail in FIG. 8 and comprises a variable resistance device 300 of any suitable type. The nature of variable resistor 300 will depend upon the parameters to be measured by the probe, but typically the resistive device may be a photocell or a thermistor. Variable resistor 300 may be connected by way of switch 301 across a resistor 302 connected in line 16. Capacitor 303 may be connected in parallel with resistor 302. Variations in resistor 300 will thus produce a slight variation in the current carried by line 16, which variations may be detected by meter amplifier 74 (FIG. 2). If desired, the effect of changes in resistor 300 may be enhanced through the use of transistor amplifier Q15 by changing switch 301 to the base of Q15.

FIG. 9 illustrates a suitable meter amplifier 74 which may be connected in line 16 to sense changes in the line current effected by probe amplifier 72. This amplifier may detect 2 or 3 volt changes caused by the probe amplifier and register these changes on meter 310. A potentiometer 311 is connected in series with line 16, with the slide arm of the potentiometer being connected to the base of amplifier Q16, whereby voltage changes in line 16 may be detected. Potentiometers 312 and 313 connected across Zener diode 314 and between the positive and negative supply lines indicated at B+ and B− provide calibration for meter 310. where the meter amplifier is used in conjunction with the power supply switch 60, the opening of switch 70 to shut down a remote machine places resistor 66 in the line and this will produce a sufficient voltage drop in the line to make the meter amplifier 74 inactive; that is, insufficient voltage will be applied to the base of Q16 to make it conductive.

Thus, there has been described a system for monitoring and controlling remote apparatus or installations. The system is capable of sensing a great variety of activities, such as fire detection systems, burglar alarms, machine operation, fluid flow, and the like and providing a unique indication at a base station of the status of the system being monitored. Various combinations of indicator lamps illustrate the particular mode in which the remote system is operating in response to the condition being sensed, and audible alarm signals may be provided as further warning of abnormal conditions. The audible alarm system may also be provided with a standby mode so that when malfunctions in the remote unit are repaired, a positive indication of such repair is given at the base unit so that the system can be returned to its normal condition. In addition, unique signaling means are provided which may, in some embodiments, be used to provide further monitoring inputs and, in other embodiments may be used as manual signalling devices to permit communication between personnel located at the remote location and at the base location. Although the present invention has been described with respect to particular embodiments, it will be apparent to those skilled in the art that numerous variations and modifications can be made in the circuits shown and described without departing from the true spirit and scope of the present invention. Therefore, it is desired that the present invention be taken as illustrative, and that the scope and extent of the invention be limited only by the following claims.

I claim:

1. A system for monitoring at a base location the pulse rate of signals generated at and transmitted from a remote location, comprising:

a remote station including an oscillator for generating said signals, means connected to said oscillator for establishing a frequency of operation of said oscillator and thus the frequency of said signal, a controller circuit for said oscillator, said controller circuit comprising means for modulating said oscillator to produce said frequency signals at a first pulse rate, and sensor means responsive to selected conditions at said remote station, said modulating means being responsive to said sensor means to change the pulse rate of said frequency signals whereby said pulse rate is indicative of a sensed condition;

means for transmitting said signals; and a base station for receiving said signals, said base station including first indicator means responsive to the pulse rate of said signals for providing an indication of the condition being sensed, second indicator means including first charge storage means connected to, and responsive to the operation of said first indicator means, the operation of said second indicator means being determined by the accumulated charge on said first charge storage means whereby both said indicator means provide an indication of said sensed condition.

2. The system of claim 1, wherein said means for modulating said oscillator includes a timing capacitor connected in circuit with said oscillator, and wherein said controller circuit further includes at least one control capacitor connectable in circuit with said timing capacitor.

3. The system of claim 2, wherein said sensor circuit includes switch means responsive to a selected condition for connecting said control capacitor in parallel with said timing capacitor.

4. The system of claim 1, wherein said means for transmitting said signals comprises first and second lines extending from said remote station to said base station, said system further including power supply means at said base location and connected to said remote station by way of said first and second lines to provide the sole source of electrical power to said remote station, said power supply being electrically isolated from said base station.

5. The system of claim 4, further including power control means at said base location and in circuit with said power supply means, and switch means at said remote station responsive to said power control means for effecting a selected control function at said remote location, said sensor means being responsive to the condition of said selected control function.

6. The system of claim 1, further including third indicator means including second charge storage means connected to, and responsive to the operation of, said first indicator means, the accumulated charge on said second charge storage means determining the operation of said third indicator means, whereby all three indicator means cooperate to provide a unique indication for each sensed condition.

7. The system of claim 6, said base station further including an audible alarm circuit having an on mode and a standby mode, said alarm circuit being connected to said second and third indicator means and responsive to selected sensed conditions.

8. The system of claim 6, wherein said base station includes means for applying received signals to said first indicator means, said first indicator means responding to signals having said first pulse rate, and said second and third indicator means being nonresponsive to signals having said first pulse rate, thereby providing a first mode indication, said first indicator means responding to a second pulse rate to charge said first charge storage means, whereby said second indicator means responds but said third indicator means remains nonresponsive to signals having said second pulse rate, thereby providing a second mode indication, said first indicator means responding to signals having a third pulse rate to permit said second charge storage means to charge and discharge intermittently, whereby said first and third indicator means respond alternately and said second indicator means remains nonresponsive to provide a third mode indication, said first indicator means responding to signals having a fourth pulse rate to charge said first and second charge storage means and thereafter to permit said second charge storage means to discharge, whereby said first, second and third indicator means respond sequentially to provide a fourth mode indication, and said first indicator means being nonresponsive to signals having a fifth pulse rate to permit said second charge storage means to discharge, whereby only said third indicator means responds to provide a fifth mode indication.

9. The system of claim 8 wherein said base station further includes an audible alarm circuit having first and second alarms, said alarm circuit being connected to said second and third indicating means and having an on mode wherein said first alarm is energized whenever said second indicator means responds to said received signals and said second alarm is energized whenever said third indicator means responds to said received signals, said alarm circuit having a standby mode wherein said second alarm is energized when said second or third indicator means returns to a nonresponsive condition.

10. The system of claim 6, wherein said first indicator means includes a first visual indicator responsive to and indicative to the pulse rate of said received signals.

11. The system of claim 10, wherein said second indicator means includes a timing network and a second visual indicator responsive to the output of said timing network, said timing network limiting the response of said second visual indicator to selected pulse rates.

12. The system of claim 11, wherein said third indicator means includes a third visual indicator, said system further including a second timing network and a monitor switch connected between said first and said third indicator means for limiting the response of said third visual indicator to selected pulse rates.

13. The system of claim 12, further including an alarm circuit connected to said second and third indicator means and having an on mode and a standby mode, said alarm circuit having first and second alarms responsive to selected pulse rates.

14. The system of claim 13, wherein said alarm circuit is connected to and responsive to the state of energization of said second and third visual indicators.

15. The system of claim 1, wherein said controller circuit means for modulating said oscillator comprises a timing capacitor and a timing switch means responsive to the charge on said timing capacitor for periodically shunting said timing capacitor and said means for establishing the frequency of said oscillator thereby periodically to interrupt the oscillation of said oscillator and establish said first pulse rate.

16. The system of claim 15, wherein said timing switch means for shunting said timing capacitor comprises a first control transistor, said controller circuit further including a second control transistor in series with said timing capacitor, said first and second control transistors comprising switch means operable in response to said sensor means for controlling the modulation of said oscillator.

17. The system of claim 16, said controller circuit further including at least one control capacitor and a corresponding control switch means, said control switch means being operable to connect said corresponding control capacitor in parallel with said timing capacitor, the connection of said control capacitor varying said means for modulating said oscillator to produce a unique pulse output rate.

18. The system of claim 17, wherein said sensor means comprises a plurality of sensor units, each said sensor unit being connected to operate one of said switch means.

19. The system of claim 17, wherein at least one of said switch means is manually operated.

20. The system of claim 15, wherein said sensor means comprises at least one surveillance loop.

21. The system of claim 15, wherein said sensor means comprises fire detector means.

22. The system of claim 15, wherein said sensor means comprises a motion-sensing device.

23. The system of claim 22, wherein said motion-sensing device includes a first reed switch and first storage capacitor and a second reed switch and second storage capacitor, means for closing said reed switches sequentially to thereby charge said storage capacitors sequentially, the charge on said second storage capacitor serving to operate said switch means for varying said timing capacitor.

24. The system of claim 16, wherein said oscillator means includes a unijunction transistor having an emitter electrode and two base electrodes, said means for establishing the frequency of operation of said oscillator comprising a biasing capacitor connected to said emitter electrode, the charging rate of said biasing capacitor regulating said frequency of operation.

* * * * *